Patented June 26, 1945

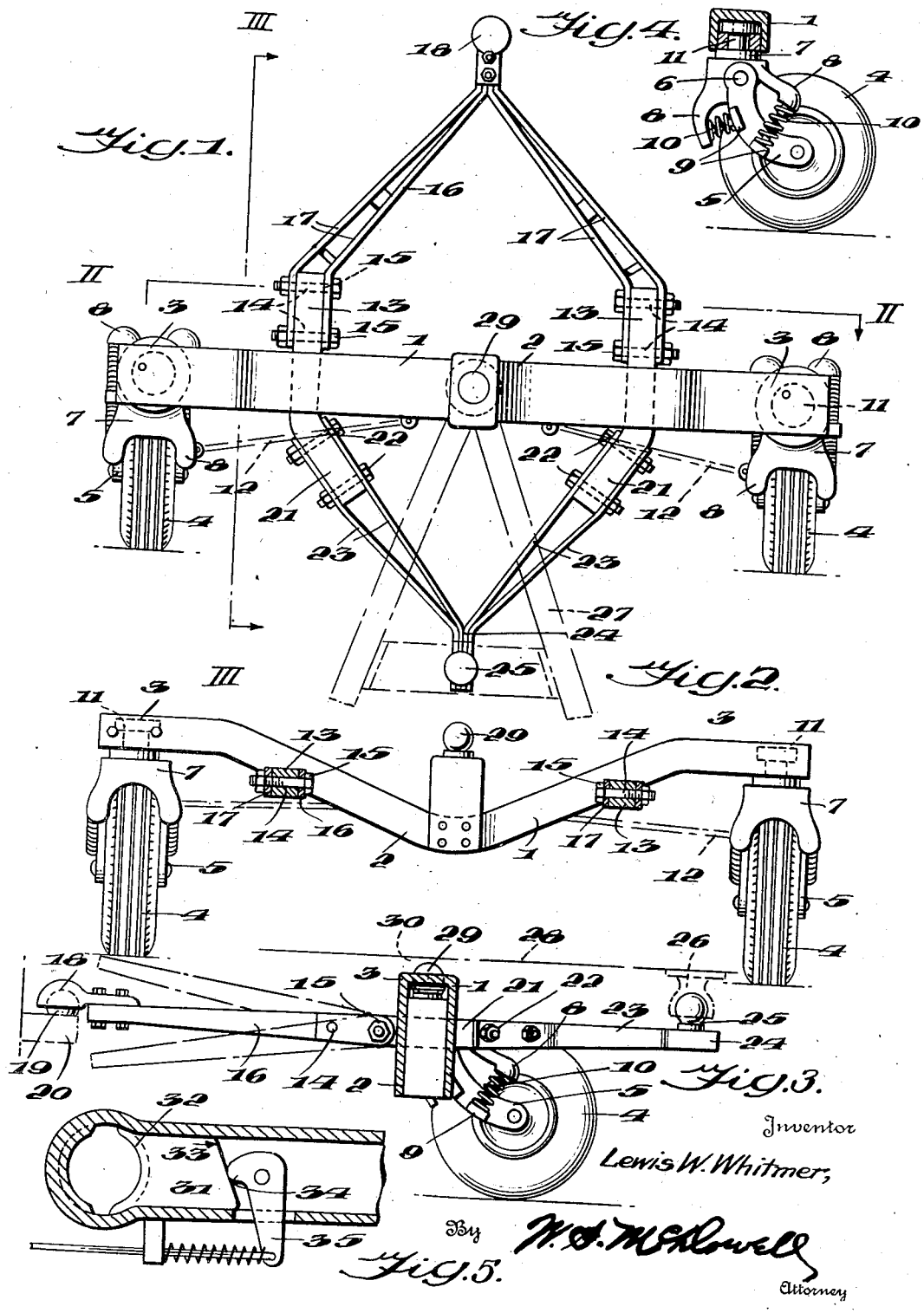

2,379,265

UNITED STATES PATENT OFFICE 2,379,265

TRUCK FOR TRAILER VEHICLES

Lewis W. Whitmer, Columbus, Ohio

Application August 21, 1943, Serial No. 499,541

2 Claims. (Cl. 280—33.4)

This invention relates to draft trucks for trailer vehicles, and has for an object to provide an improved wheeled truck for supporting and uniting the front end of a drawn trailer vehicle to or in connection with the rear part of an automotive draft vehicle.

The coupling connections now generally used for uniting trailer vehicles to automobiles are unsatisfactory or objectionable in several respects. For example, the usual trailer vehicle is mounted on but a single axle disposed toward the rear thereof, while the front thereof is supported by the drawbar and coupling connection with the rear of the towing or propelling vehicle. As a result, the weight of the trailer vehicle and its load is borne largely by the propelling vehicle, and since the latter in most cases is a standard passenger car, the same is subject to considerable stress and strain for which it was not originally designed to receive. The two-wheel trailer construction, however, does offer the advantage of convenience in forward driving and, therefore, it is one of the outstanding objects of the present invention to provide an improved forward wheeled truck for the trailer vehicle by means of which the weight, stresses and strains of the trailer are removed largely from the towing vehicle and yet through the provision of caster wheels on the draft truck, to provide for the same facility in steering and manipulation as has been obtained with the use of the ordinary two-wheeled trailer.

It is another object of the invention to provide a draft for trailer vehicles which may be readily disconnected from an associated trailer vehicle and used as an independent load-carrying trailer unit. When used independently of the trailer vehicle, means are provided for precluding movement of the caster wheels of the draft truck about their vertical axes and to control the effective length of the tongue structure used in uniting the draft truck with the towing car, so that bodies of varying length may be supported on a transport by the draft truck.

For a further understanding of the invention, reference is to be had to the following description and the accompanying drawing, wherein:

Fig. 1 is a plan view of a draft truck for trailer vehicles formed in accordance with the present invention;

Fig. 2 is a vertical transverse sectional view taken through the draft truck on the plane indicated by the line II—II of Fig. 1;

Fig. 3 is a vertical longitudinal sectional view on the plane indicated by the line III—III of Fig. 1;

Fig. 4 is a side elevational view of one of the caster wheels of the truck;

Fig. 5 is a horizontal sectional view taken through one of the coupling members.

Referring more particularly to the drawing, the numeral 1 designates the axle beam of my improved trailer draft truck. This beam is preferably in the form of a structural steel member of channel-shaped cross sectional configuration, the same being formed to embody a lowered intermediate portion 2 and relatively elevated outer ends 3. The outer ends of said beam carry rubber tired caster wheels 4, which wheels may be of the type disclosed in my prior Patent No. 2,325,822, granted August 3, 1943, or of other suitable design.

As illustrated, each of the wheels has its axle connected with a yoke 5, the upper end of the yoke being pivoted as at 6 to a head 7. The head is formed on opposite sides with laterally spaced arms 8, and between the outer ends of these arms and lugs 9, provided on the yoke 5, are arranged opposed coil springs 10, which yieldably restrict swinging movement of the yokes 5 about the pivot 6. The upper ends of each of the heads 7 is provided with a vertical fulcrum stud 11, which is received within bearings provided in the outer ends of the axle beam 1, permitting of turning movement of the associated caster wheel about a vertical axis. By means of removable tie rods 12, extending between said caster wheels and the cross beam 1, the said wheels may be prevented from turning about their vertical axes, this feature being desirable when the draft truck is used as an independent load-carrying unit and separated from an associated trailer vehicle.

To unite the axle beam with an associated propelling or towing vehicle, the beam 1 has secured thereto a pair of bars 13. The forward portions of these bars project perpendicularly in horizontal planes from the beam 1 and are provided with spaced openings 14. These openings are adapted to receive at least one set of aligned bolts 15, which are used in pivotally uniting the rear ends of a tongue structure 16 with the cross beam 1. The tongue structure, in the specific form illustrated, comprises joined sets of metallic straps 17 which converge in a forward direction and are united together in the longitudinal axis of the draft vehicle, as by welding the same. The joined forward ends of the straps 17 provide a seat for the reception of a socket member 18, the socket of the latter being adapted to receive the ball element 19 of the coupling hitch 20, carried by the bumper structure, or other similarly situated part, of the propelling vehicle.

When one set of the bolts 15 is used in uniting the rear end of the tongue structure to the bars 13 of the beam 1, it will be seen that the tongue structure may rock vertically as indicated in dotted lines in Fig. 3. This is desirable in compensating for variations in vertical position of the beam 1 with respect to the vehicle carried hitch 20. If, however, a rigid tongue structure is desired, particularly when the draft truck is used independently of the trailer vehicle, an extra set of the bolts 15 may be positioned in the openings 14, as shown by dotted lines in Fig. 1, thereby restricting the tongue to a fixed horizontal position.

The intermediate portions of the bars 13 are welded or otherwise firmly secured to the beam 1 and, to the rear of the latter, the bars 13 are angularly bent in inwardly converging directions, as indicated at 21. To these inwardly bent portions of the bars, there are attached, as at 22, the forward ends of rearwardly converging metallic strap members 23, the latter being joined and united at their rear ends, as disclosed at 24. Positioned upon the rear end 24 of the strap 23 is a ball element 25, which is adapted to be received within a socket member 26 carried by the frame 27 of a trailer vehicle 28. Also, the depressed central portion of the axle 1 carries a fixed ball element 29, which is received in a socket 30 provided at the forward end of the frame 27. The longitudinally spaced ball elements 25 and 29 permit the body of the trailer vehicle to move to a limited extent both vertically and laterally with respect to its normal plane of operation. However, the employment of the extra element 25 maintains the longitudinal axis of the trailer vehicle perpendicular at all times to the corresponding axis of the beam 1, so that the trailer vehicle when being drawn forwardly will maintain a centered position with respect to the beam, avoiding weaving of the trailer vehicle along the roadway.

Likewise, the use of the dual ball elements 25 and 29 provide for improved control of the trailer vehicle during backing operations or when executing maneuvers in which turns of short radii are necessary or desirable.

As shown in Fig. 5, the socket members 18, 26 or 30 may be provided with confined sliding jaws 31. These jaws may be formed at one end with arcuate surfaces 32 to conform with the configuration of the ball elements, while the opposite ends of said jaws are beveled as at 33. Cooperative with the beveled surfaces of said jaws are the rounded edges 34 provided on the inner ends of pivoted actuating levers 35. These levers are preferably spring pressed as at 36 so that the jaws 31 are normally held in their ball-clamping positions and compensation provided for wear. By a manual operation, the levers may be actuated to permit of the retraction of the jaws 31 and the release of the ball elements associated therewith.

In view of the foregoing, it will be seen that the present invention provides a draft truck for auto-trailer vehicles by which an improved support is provided for the normally unwheeled forward end of such trailer vehicles, enabling the weight of the latter to be sustained by the truck and to relieve the towing car of the stresses and strains imposed thereon when a two-wheeled trailer vehicle construction is used in accomplishing this result, the same facility in steering and manipulation of the trailer vehicle is obtainable as when a two-wheeled trailer vehicle is used through the employment of the freely turning caster wheels on the cross beam. By the use of the dual coupling head shown at 25 and 29, the longitudinal axis of the trailer vehicle is maintained in true perpendicular relationship to the corresponding axis of the cross beam 1 of the draft truck, so that the trailer vehicle does not tend to weave or swing laterally to an undesired extent with respect thereto. Moreover, this dual connection provides greater control over the trailer vehicle during backing operations, enabling the latter to be performed easily and accurately.

The draft truck may be used independently of the trailer vehicle as a separate load-carrying instrumentality. When so used, it is preferable that the tongue 16 should be held against pivotal movement. If the object carried by the truck when it is used independently should be of excess length, such as in the support of boats, telephone poles or the like, an extension tongue may be united with the forward end of the tongue structure 16.

I claim:

1. A truck for auto-drawn trailer vehicles, comprising a transversely extending beam having a depressed central region and relatively elevated outer ends, ground-engaging caster wheels carried by and disposed beneath the outer ends of said beam, a tongue structure pivotally united with and projecting forwardly from said beam, a coupling member carried by the forward end of said tongue structure and adapted for detachable connection with the rear of an associated propelling vehicle, a frame carried by and extending rearwardly from said beam, a coupling member carried by the rear part of said frame, and a trailer-coupling member mounted on the depressed central region of said beam and extending upwardly therefrom in longitudinal alignment with the frame-carried coupling member.

2. A truck for auto-drawn trailer vehicles, comprising a transversely extending beam having a depressed central region and relatively elevated outer ends, ground-engaging caster wheels carried by and disposed beneath the outer ends of said beam, a tongue structure united with and projecting forwardly from said beam, a coupling member carried by the forward end of said tongue structure and adapted for detachable connection with the rear of an associated propelling vehicle, a frame carried by and extending rearwardly from said beam, a coupling member carried by the rear part of said frame, a trailer-coupling member mounted on the depressed central region of said beam and extending upwardly therefrom in longitudinal alignment with the frame-carried coupling member, and means uniting the caster wheels with said beam for precluding turning movement of said wheels about their vertical axes.

LEWIS W. WHITMER.